United States Patent
Niwano

(10) Patent No.: US 10,598,524 B2
(45) Date of Patent: Mar. 24, 2020

(54) MEASURING INSTRUMENT THAT DETECTS DISPLACEMENT OF A CONTACT POINT

(71) Applicant: MITUTOYO CORPORATION, Kawasaki, Kanagawa (JP)

(72) Inventor: Atsuya Niwano, Tokyo (JP)

(73) Assignee: MITUTOYO CORPORATION, Kawasaki (JP)

(*) Notice: Subject to any disclaimer, the term of this patent is extended or adjusted under 35 U.S.C. 154(b) by 400 days.

(21) Appl. No.: 15/637,262

(22) Filed: Jun. 29, 2017

(65) Prior Publication Data

US 2018/0031398 A1 Feb. 1, 2018

(30) Foreign Application Priority Data

Aug. 1, 2016 (JP) .................. 2016-151192

(51) Int. Cl.
| | |
|---|---|
| *G01B 3/22* | (2006.01) |
| *G01B 9/00* | (2006.01) |
| *G01D 13/22* | (2006.01) |
| *G06F 3/042* | (2006.01) |
| *G01B 3/18* | (2006.01) |
| *G01B 3/24* | (2006.01) |
| *G06F 7/498* | (2006.01) |

(52) U.S. Cl.
CPC .............. *G01D 13/22* (2013.01); *G01B 3/22* (2013.01); *G01B 9/00* (2013.01); *G06F 3/042* (2013.01); *G01B 3/18* (2013.01); *G01B 3/24* (2013.01); *G06F 7/4983* (2013.01)

(58) Field of Classification Search
CPC .................................. G01D 13/22; G01B 9/00
USPC .......................................................... 116/284
See application file for complete search history.

(56) References Cited

U.S. PATENT DOCUMENTS

| | | | | |
|---|---|---|---|---|
| 4,593,473 A | * | 6/1986 | Shimomura | ........... G01D 3/063 33/551 |
| 2012/0130547 A1 | * | 5/2012 | Fadell | ...................... F24F 11/30 700/276 |

FOREIGN PATENT DOCUMENTS

JP S59-180416 A 10/1984

* cited by examiner

Primary Examiner — Walter L Lindsay, Jr.
Assistant Examiner — Philipmarcus T Fadul
(74) Attorney, Agent, or Firm — Oliff PLC

(57) ABSTRACT

A measuring instrument is configured to detect a displacement of a contact point provided to be movable and to digitally display a measured value on a display unit provided on an outer surface of a case. The measuring instrument includes an input unit. The input unit is provided on the outer surface of the case and is configured to allow a user to input to the input unit through a manual operation. The input unit includes a sensor which is configured to detect an amount of operation and a speed of operation. The amount of operation is converted into a conversion value in view of the speed of operation and then is displayed on the display unit.

5 Claims, 7 Drawing Sheets

MEASURING INSTRUMENT THAT DETECTS DISPLACEMENT OF A CONTACT POINT

CROSS-REFERENCE TO RELATED APPLICATION

This application claims the benefit of Japanese Patent Application No. 2016-151192, filed on Aug. 1, 2016, the entire contents of which are hereby incorporated by reference, the same as if set forth at length, the entire of which are incorporated herein by reference.

TECHNICAL FIELD

The present invention relates to a measuring instrument. In particular, the present invention relates to a small measuring instrument configured to digitally display a measured value on a display unit, such as a digital dial gauge (digital indicator), a digital micrometer, a digital vernier calipers and the like.

BACKGROUND ART

As small measuring instruments which allow a measurer to carry out measurement by hand, for example, a dial gauge, a vernier calipers or a micrometer are known.

As advance preparations before a work is actually measured, a variety of setting need to be performed on a measuring instrument.

For example, operations, such as setting of tolerance, presetting of a start value and setting compensation factor, are required. Therefore, conventional digital measuring instruments are provided with a plurality of operation buttons or key switches.

In order to enhance a working efficiency, a type is also known in which a value detected by an encoder is intactly stored and set in a memory using a preset switch or hold switch (JP-A-S59-180416). In this case, a spindle is moved, a position thereof is detected by an encoder and then a value at that time is set in a memory by a preset switch or hold switch.

SUMMARY OF INVENTION

It is very troublesome and cumbersome to set a numerical value (numeralize) by pressing a plurality of operation buttons or key switches many times. In addition, if the value detected by the encoder is intactly used as a preset value, it is difficult to precisely set the preset value to a target value.

An object of the present invention is to provide a measuring instrument in which setting operations can be quickly and simply performed.

According to one aspect of the disclosure, a measuring instrument is configured to detect a displacement of a contact point provided to be movable and to digitally display a measured value on a display unit provided on an outer surface of a case. The measuring instrument includes an input unit. The input unit is provided on the outer surface of the case and is configured to allow a user to input to the input unit through a manual operation. The input unit includes a sensor which is configured to detect an amount of operation and a speed of operation. The amount of operation is converted into a conversion value in view of the speed of operation and then is displayed on the display unit.

According to one aspect of the disclosure, the input unit includes a rotary ring which is provided on the outer surface of the case and which is configured to be rotated by the manual operation.

According to one aspect of the disclosure, the case has a short cylinder shape. The rotary ring is a circular ring and is rotatably fitted to the case while surrounding a side surface of the case.

According to one aspect of the disclosure, the input unit is a touch panel provided on the outer surface of the case.

According to one aspect of the disclosure, the touch panel is assembled in a display surface of the display unit.

According to one aspect of the disclosure, the measuring instrument is any one of a dial gauge, a vernier calipers and a micrometer.

DESCRIPTION OF EMBODIMENTS

Figure 1:
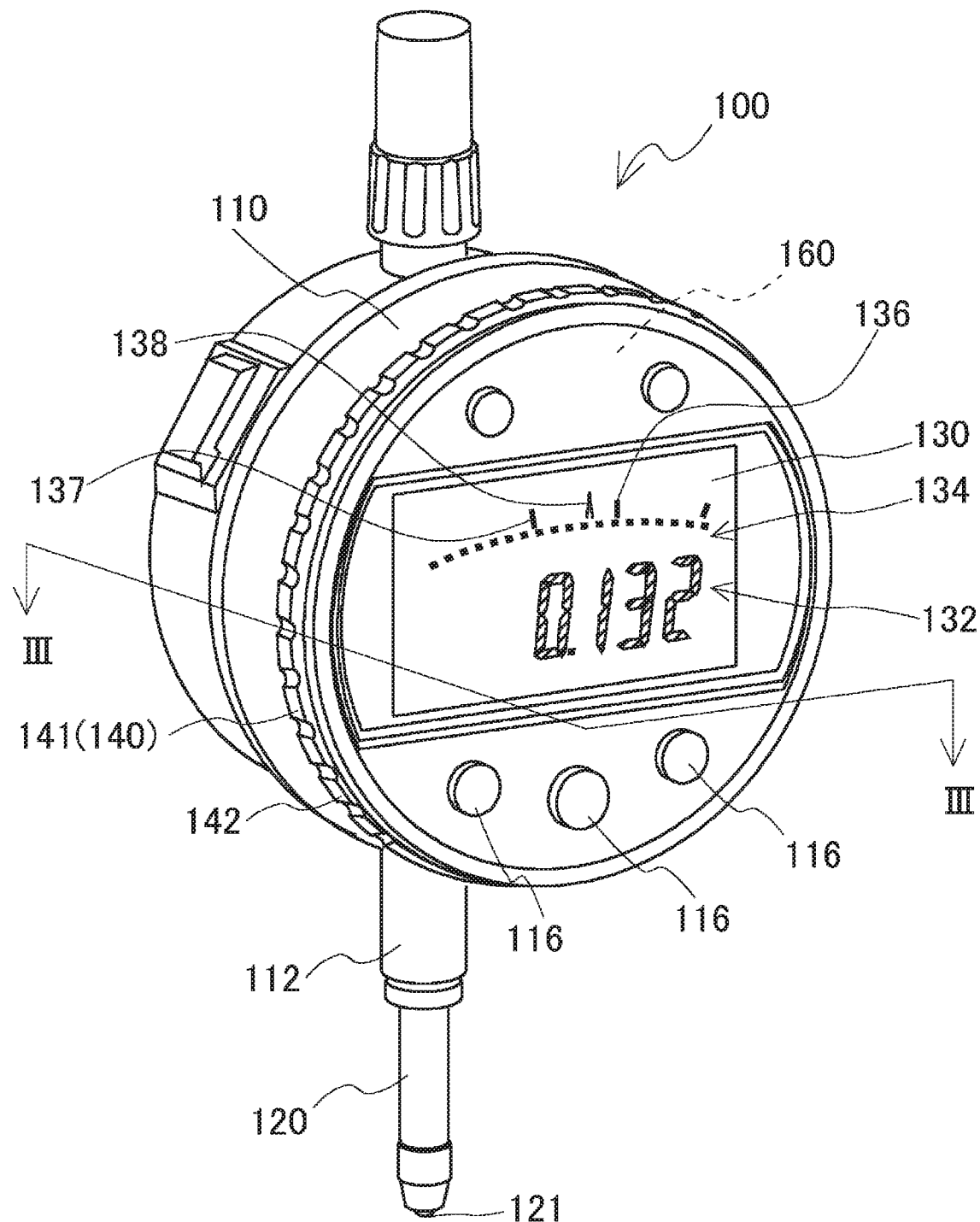
FIG. 1 is a perspective view showing the exterior of a digital display type dial gauge.

Exemplary Embodiments of the present invention will be illustrated and also described with reference to reference numerals attached to elements in the drawings.

First Embodiment

The first embodiment of the present invention will be described.

FIG. 1 is a perspective view showing the exterior of a digital display type dial gauge 100.

The dial gauge 100 is configured to digitally display a displacement of a spindle 120 on a display unit 130.

The dial gauge 100 includes a case 110, the spindle 120, the display unit 130, input means (116, 140) and a control circuit unit 160.

The case 110 is a short cylinder-shaped case body.

A stem 112 is provided to protrude from a side surface of the case 110, and the stem 112 serves as a bearing for the spindle 120.

The spindle 120 has a contact point 121 at a distal end thereof and is supported to be movable axially back and forth through the case 110. An encoder for detecting a displacement of the spindle 120 is built in the case 110.

The display unit 130 is arranged substantially on the central region of a front-side end surface of the case 110. The display unit 130 is, for example, a liquid crystal display panel and is configured to display information by a segment system.

Alternatively, as the display unit 130, a dot-matrix type liquid crystal display panel, an organic EL panel, or an electronic paper may be employed.

Figure 2:
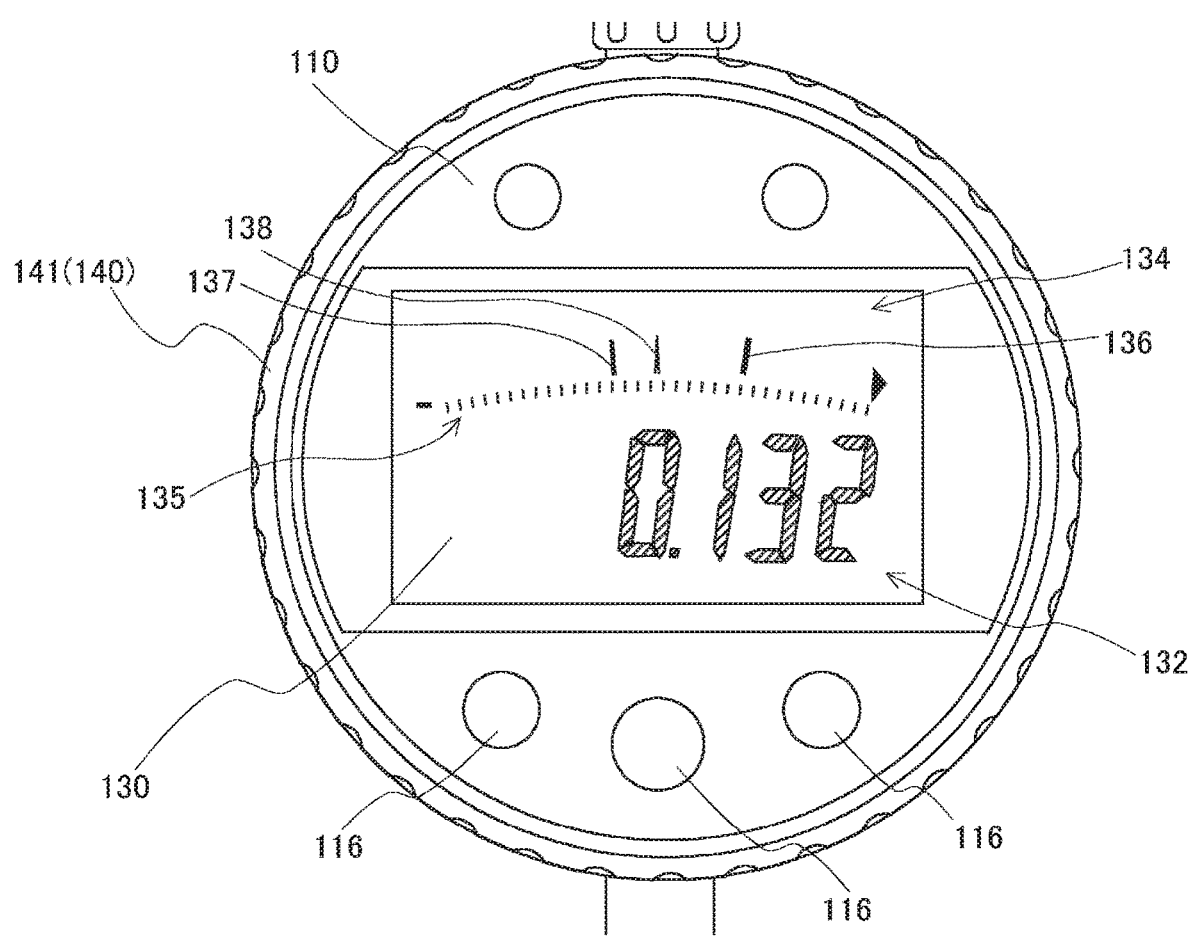
FIG. 2 is a view showing a displaying example of a display unit.

FIG. 2 shows a displaying example of the display unit 130.

The display unit 130 has a numerical value display portion 132 and an analogue scale display portion 134.

The numerical value display portion 132 is configured to display a numerical value, for example, by a 7-segment system.

Meaning of the numerical value displayed thereon is varied depending on a mode selected at that time. For example, in a case of a measuring mode, the numerical value on the numerical value display portion 132 is naturally a measured value itself. For example, in a case of a tolerance setting mode or a presetting mode, the numerical value on the numerical value display portion 132 indicates a tolerance or a start value that a user wants to input by the input means 116, 140. These will be described below.

On the analogue scale display portion 134, a circular arc-shaped scale 135 and a number of marks (136, 137, 138) indicated and controlled to slide on the scale 135 are displayed.

In the example of FIG. 2, three marks are on the circular arc-shaped scale 135.

The rightmost mark 136 is a mark 136 for indicating the maximum tolerance which is an upper limit value.

The leftmost mark 137 is a mark 137 for indicating the minimum tolerance which is a lower limit value. In addition, a needle-shaped pointer mark 138 having a pointed tip and a slightly longer length is intended to imitate an analogue display type pointer and is configured to move in accordance with a measured value.

Next, the input means will be described.

As the input means, a plurality of buttons 116 and a rotational operation input portion 140 are provided.

The plurality of buttons 116 are arranged on the front-side en surface of the case 110 and below the display unit 130.

To these buttons 116, for example, functions, such as a mode switching instruction or a numerical value acquiring instruction, are assigned.

The rotational operation input portion 140 will be described.

The rotational operation input portion 140 has a rotary ring 141 and sensors 151, 512 for detecting rotation of the rotary ring 141.

The rotary ring 141 is arranged on a side surface of the case 110 and is provided to be rotatable.

Figure 3:
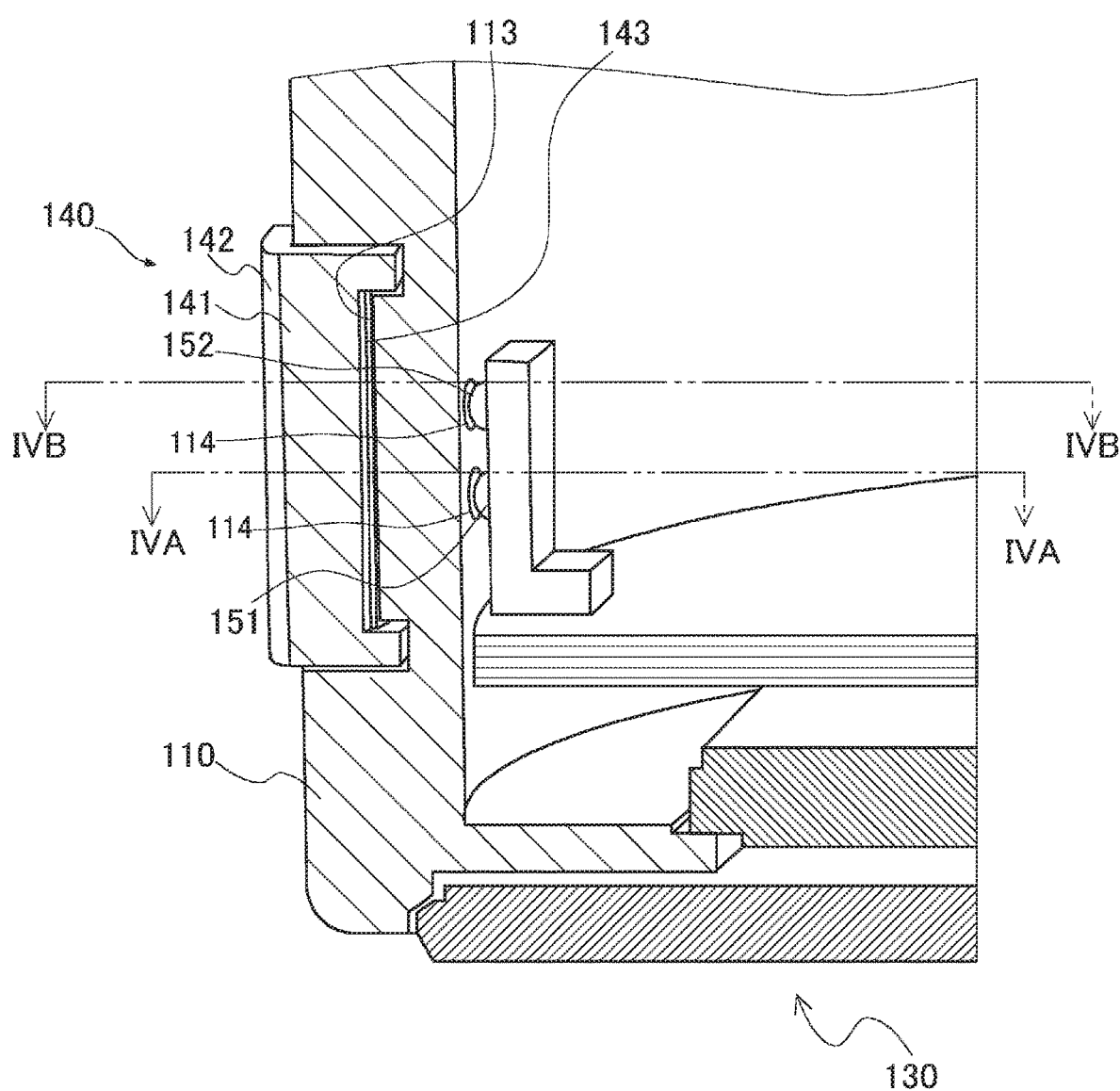
FIG. 3 is a sectional view taken along a line III-III in FIG. 1.
Figure 4:
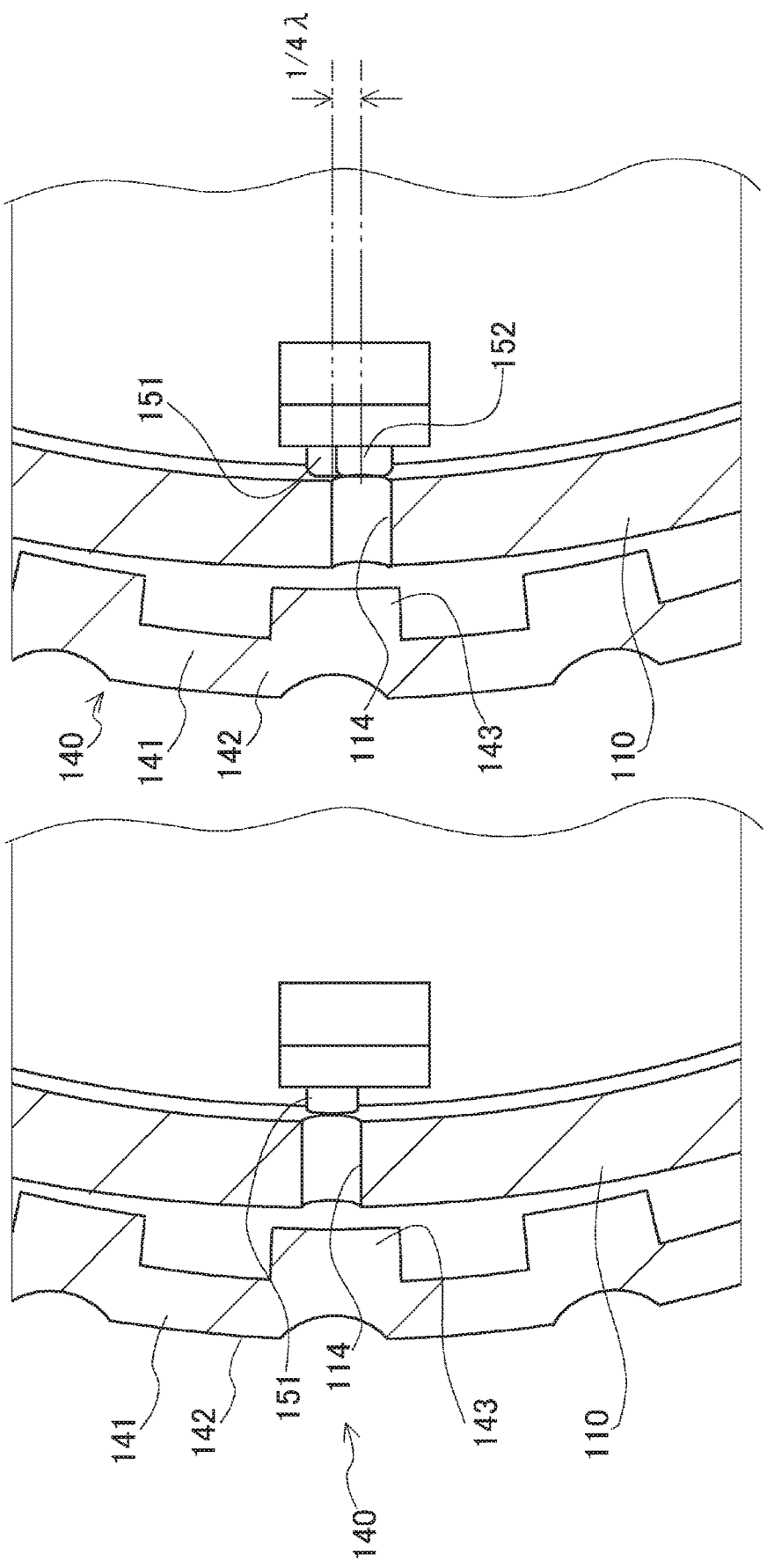
FIG. 4A is a sectional view taken along a line IVA-IVA in FIG. 3
FIG. 4B is a sectional view taken along a line IVB-IVB in FIG. 3.

Referring to FIGS. 3 and 4, a structure of the rotational operation input portion 140 will be described.

FIG. 3 is a sectional view taken along a line III-III in FIG. 1.

An unevenness 142 for preventing slippage is provided on an outer surface of the rotary ring 141, and gear teeth 143 are formed on an inner surface of the rotary ring 141. Namely, the rotary ring 141 is a so-called internal gear.

On an outer surface of the case 110, a recessed groove 113 is provided to extend around a cylindrical side surface thereof, and the rotary ring 141 is rotatably fitted into the recessed groove 113.

The sensors 151, 152 are attached to an inner surface of the case 110 and are configured to detect rotation of the rotary ring 141 through a hole 114 formed in the case 110.

Photo sensors are used as the sensors 151, 152 and are configured to emit light toward the gear of the rotary ring 141, to receive a reflected light and then to output light reception signals S1, S2.

In order to distinguish between a positive (e.g., clockwise) direction rotation and a negative (e.g., counterclockwise) direction rotation of the rotary ring 141, two sensors 151, 152 are provided. One is referred to as a first sensor 151 and the other is referred to as a second sensor 152.

FIG. 4A is a sectional view taken along a line IVA-IVA in FIG. 3 and FIG. 4B is a sectional view taken along a line IVB-IVB in FIG. 3.

As shown in FIGS. 4A and 4B, the first sensor 151 and the second sensor 152 are positioned to be offset from each other by a ¼ wavelength with respect to a cycle (pitch) of the internal gear of the rotary ring 141. Due to this combination of positions, a direction of rotation of the rotary ring 141 is specified by light reception signals from the first sensor 151 and the second sensor 152.

Meanwhile, the offset amount between the first sensor 151 and the second sensor 152 is not limited to the ¼ wavelength, but may be a ⅓ wavelength or a ⅛ wavelength. Also, the offset amount may be preferable if, for example when being plotted in a Lissajous curve, processing is performed to correspond to the offset amount.

Figure 5:
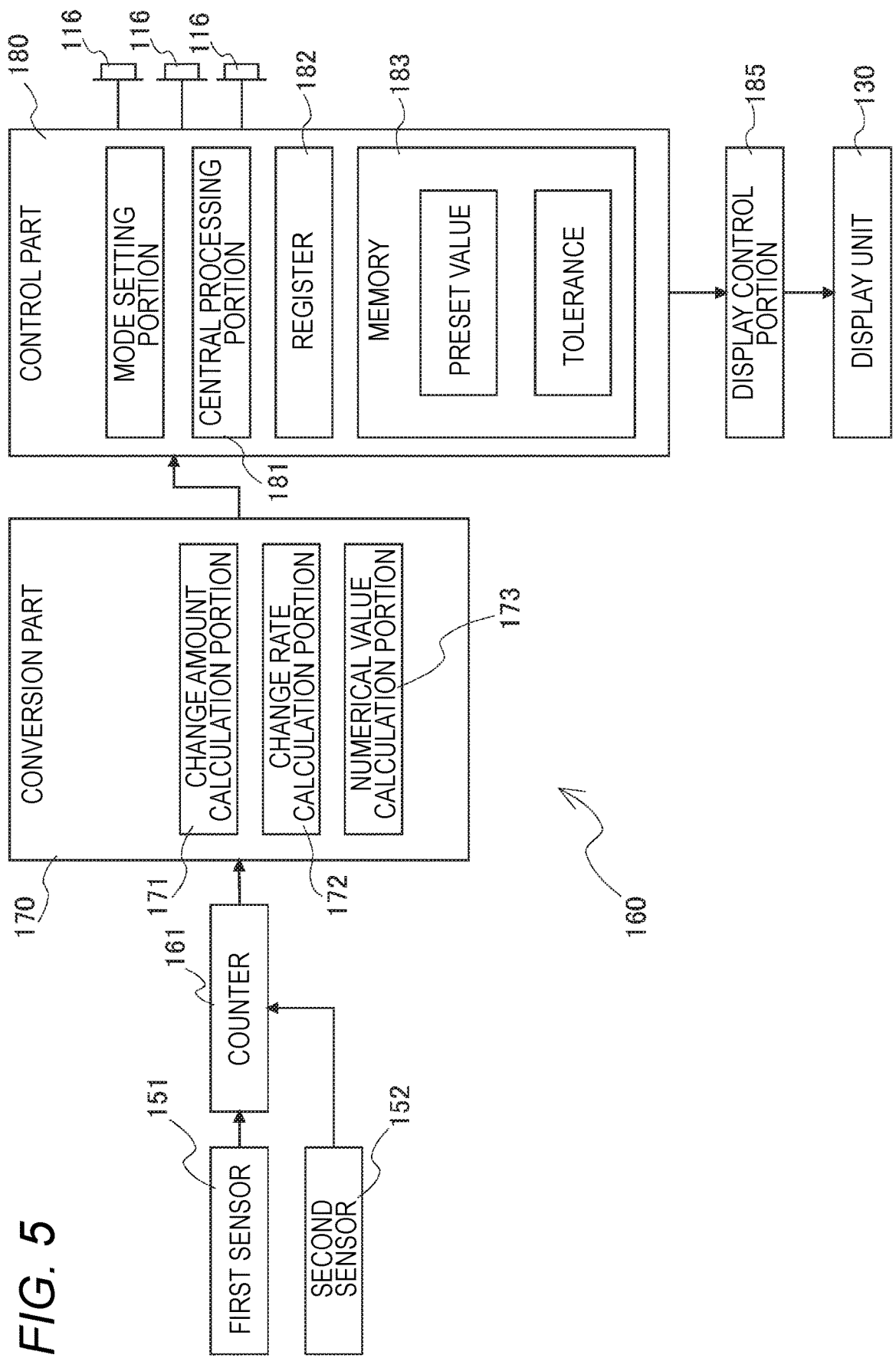
FIG. 5 is a functional block diagram of a control circuit unit.

Next, FIG. 5 is a functional block diagram of the control circuit unit 160.

A counter 161 is configured to count which direction and how many pitches the teeth 143 of the rotary ring 141 are moved based on the light reception signals S1, S2 from the first sensor 151 and the second sensor 152. For example, if the number of rotation and direction of rotation of the Lissajous curve is obtained by plotting the light reception signal S1 and the light reception signal S2 on rectangular coordinates, movement and direction of the teeth 143 of the rotary ring 141 can be founded. The counter 161 is configured to count up if the rotary ring 141 is rotating in a positive (clockwise) direction and to count down if the rotary ring 141 is rotating in a negative (counterclockwise) direction.

A count value from the counter 161 is sent to a conversion part 170 every moment.

The conversion part 170 has a change amount calculation portion 171, a change rate calculation portion 172, and a numerical value calculation portion 173. The change amount calculation portion 171 is configured to calculate a change amount of the count value from the counter 161.

For example, the change amount calculation portion 171 is configured to calculate a difference between count values at predetermined time intervals (e.g., per second). If a count value at the last time (one second ago) is C0 and a count value at the current time (one second later) is C1, a difference between the count values is "C1-C0".

The change rate calculation portion 172 is configured to calculate a change rate of the count value.

Herein, a magnitude of a change rate of the count value is required.

Since the difference D between the count values per second is calculated in the change amount calculation portion 171 every moment, the absolute value IDI thereof is preferably set as the magnitude V of the change rate.

The numerical value calculation portion 173 is configured to obtain a conversion value N based on the difference D1 between the count values and the magnitude V of the change rate. For example, the conversion value N is obtained in accordance with the following equation:

$$N = k \times h(V) \times D$$

where k is a coefficient as determined in accordance with a selected mode (tolerance setting mode or presetting mode) or an unit (mm or inch); and $h(V)$ is a function having a positive correlation with respect to a magnitude of V, in which the function h is set such that as V is increased, $h(V)$ is increased, whereas as V is decreased, $h(V)$ is decreased.

A range (region of values) of h(V) may be set to be monotonously increased, for example, from 0.1 to 100.

Even when a user rotates the rotary ring 141 by the same amount (by the same angle), a change of the conversion value N is small if the rotary ring 141 is slowly rotated, the change of the conversion value N is large if the rotary ring 141 is quickly rotated, and the change of the conversion value N is very large if the rotary ring 141 is very quickly rotated. Therefore, by rotating the rotary 141, the user can conveniently and quickly input a desired command (numerical value) using an amount of rotation, a direction of rotation and a speed of rotation.

The command, which is inputted by the user using the rotary ring 141 as described above, is converted into the conversion value V and then outputted to a control part 180.

In the control part 180, a central processing portion 181 is configured to add (or subtract) the conversion value N to (or from) an numerical value of a register 182 and then to send the calculated result to a display control portion 185 in accordance with a selected mode. Then, an indication thereof is reflected on the display unit 130 due to display control by the display control portion 85.

Several examples of inputting using the rotational operation input portion 140 will be introduced.

Example 1 of Tolerance Setting

For example, if a masterwork already exists and a tolerance of a product is +/−0.3 mm with respect to the masterwork, the tolerance of +/−0.3 mm is preferably set in the dial gauge 100. Since the dial gauge 100 is a digital type, it is easy to cause a user to be notified by color or sound when a measured value of an object to be measured is deviated from the set tolerance.

The user inputs a numerical value of "0.3" into the dial gauge 100 while selecting the tolerance setting mode by pressing a switch.

The numerical value of "0.3" is a small numerical value.

At this time, the user slowly rotates the rotary ring 141. Then, h(V) becomes a small value and thus the conversion value N also becomes a small vale.

In this way, it is possible to simply input a small numerical value, such as "0.3", by only a very natural operation of slowly rotating the rotary ring 141. The numerical value (e.g., 0.3) inputted as described above is indicated on the numerical display portion 132, and also the marks 136, 137 of the analogue scale display portion 134 are moved to correspond to a magnitude of the numerical value. If the indication becomes a target numerical value (0.3), the button 116 (also referred to as a hold switch or an acquisition switch) is pressed and thus the numerical value (0.3) is stored as a tolerance in a memory 183.

Example 2 of Tolerance Setting

For example, if a masterwork does not exist but an allowable range of a product is instructed as 49.7 mm to 50.3 mm by an instruction on the design drawing, a tolerance of 49.7 mm to 50.3 mm is set in the dial gauge 100.

The numerical value "49.7" or "50.3" is a larger value than "0.3".

At this time, like the above case, a user only has to rotate the rotary ring 141, but quickly rotates the rotary ring 141 since such larger numerical values have to be inputted. Then, h(V) becomes a large value and thus the conversion value N also becomes a large value. In this way, it is possible to simply input large numerical values, such as "49.7" or "50.3", by only a very natural operation of quickly rotating the rotary ring 141.

If the numerical value of the indication is increased with the same step as when "0.3" is inputted, a significant operation is required to cause the numerical value to reach just "49.7".

In the case of convention machines in which numerical values are inputted only by a button 116, machines in which a "digit" to be inputted can be selected are also known. However, it is very difficult to input all numerical values "4", "9", "7", "5", "0", "3" while moving a digit to be inputted.

In this respect, according to the present embodiment, both Examples 1 and 2 of tolerance setting are the same operation and also simple, thereby allowing the multifunctional digital dial gauge 100 to be more easily used.

(Presetting)

Another example of numerical value setting will be introduced.

A large number of dial gauges 100 have a relatively short measurement range, such as 12.5 mm. However, it is convenient that an actual product size, such as 50.2 mm or the like, is displayed as an indication of a measured value (or acquisition of the measured value).

In this case, before measuring is actually started, a start value is set (preset) to "50". A method for presetting is exactly the same as above and includes quickly rotating the rotary ring 141, pressing the button 116 if an indication of "50" is displayed, and then storing the numerical value (50) as a preset value in the memory 183.

In the conventional machines, it is troublesome to input a numerical value, such as "50", but in the present embodiment, an operation of presetting is also simple. The multifunctional digital dial gauge 100 can be more easily used.

Although inputting of a numerical value has been described in the foregoing examples, the rotary ring 141 may be used to select items on a display screen.

For example, there is setting of a calculation equation as an advance preparation before using the dial gauge 100.

For example, there is a case where values of parameters A, B and C of a (correction) calculation equation, such as Ax+By+1/C, are set and inputted.

At this time, if the rotary ring 141 is rotated while the calculation equation (Ax+By+1/C) is displayed on the display screen, a cursor is moved such as A→B→C, thereby reducing the effort of selecting and inputting.

(Variant 1)

Although in the foregoing embodiment, the rotary ring 141 is described as being provided to extend around the cylindrical outer surface of the case 110, a smaller rotary ring 141 as a variant may be employed. If the rotary ring 141 is provided to partially protrude out of the case 110 and thus to be rotationally operated by a user, the rotary ring 141 may be partially housed in the case 110.

Figure 6:
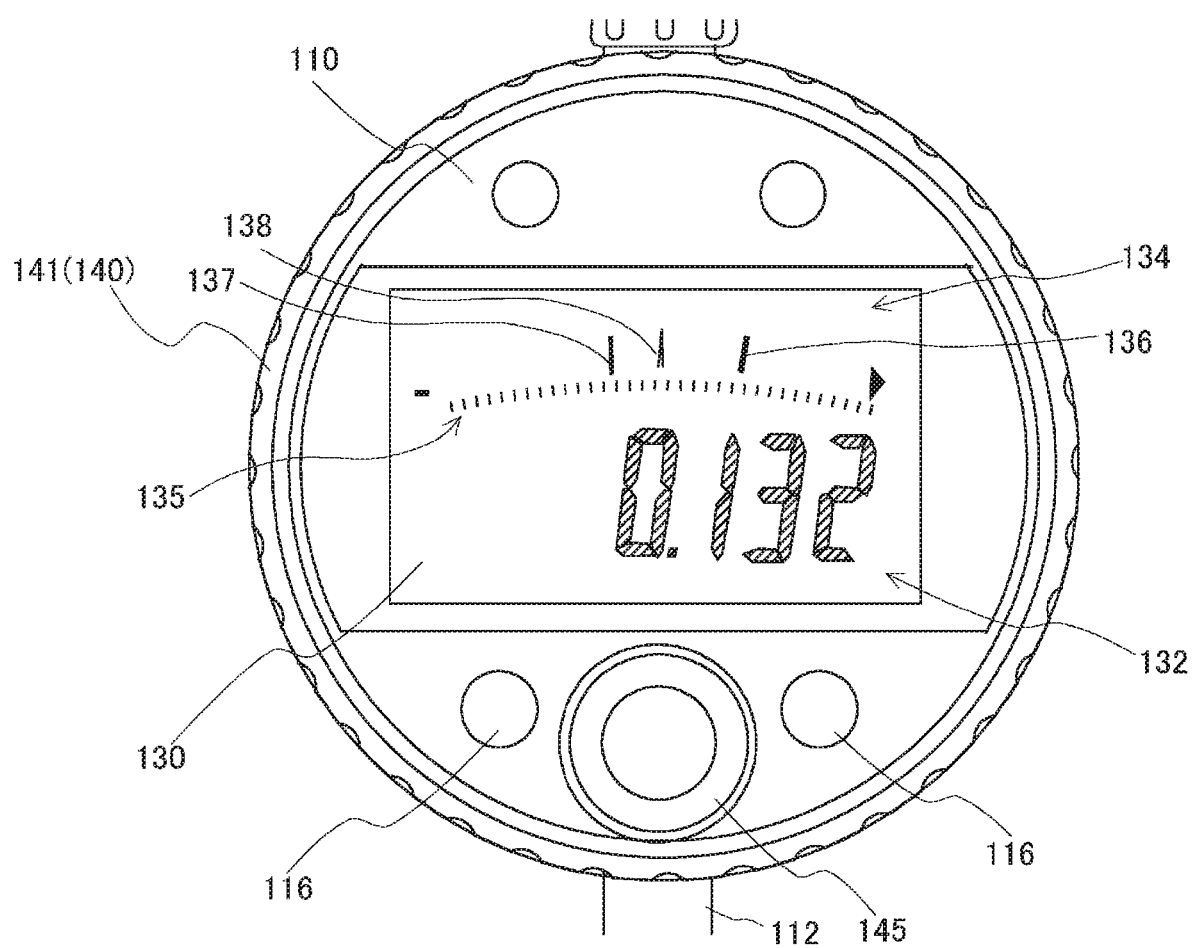
FIG. 6 is a view showing a variant of a rotary ring.

A location at which the rotary ring 141 is arranged is not limited to the side surface of the case 110. For example, as illustrated in FIG. 6, a rotary ring 145 may be arranged on the front surface of the case 110.

(Variant 2)

Although in the foregoing description, the rotational operation input portion 140 (rotary ring 141) is illustrated as the input means, the input means is not limited to the rotational operation input portion 140 (rotary ring 141) so long as an input can be instructed by an amount of operation, a direction of operation and a speed of operation.

Figure 7:
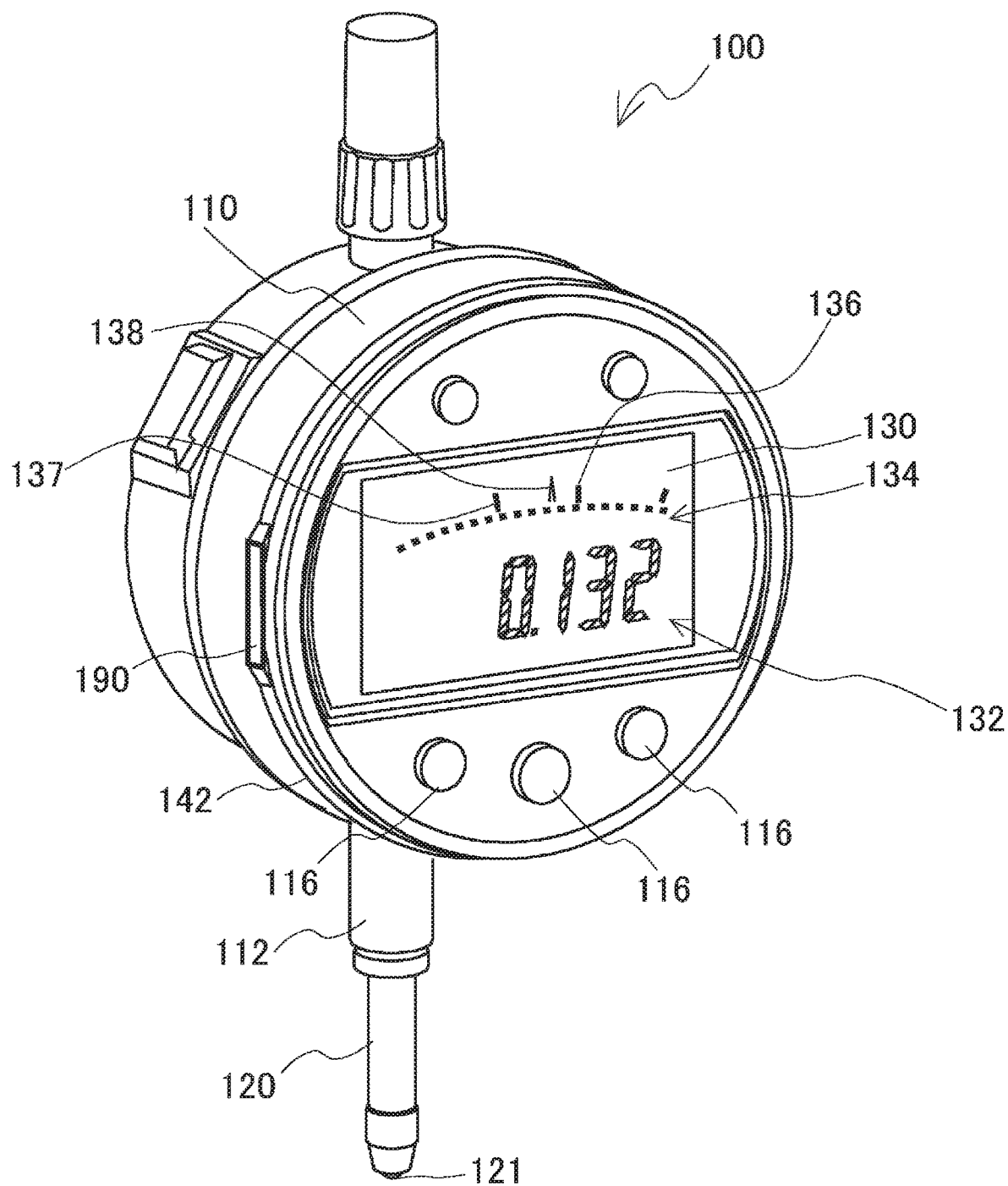
FIG. 7 is a view showing a variant in which a touch panel as an input means is employed.

For example, as illustrated in FIG. 7, a touch panel 190 as the input means may be employed, and thus an amount of operation, a direction of operation and a speed of operation may be detected by the touch panel 190.

Since it is sufficient that the rotary ring 141 as described above is replaced with the touch panel 190, a width of the touch panel 190 may be narrow although a vertical length thereof may be necessary to some extent.

For example, the touch panel 190 may be elongated to have an aspect ratio of 3 to 5.

An increased aspect ratio, i.e., an aspect ratio of 5 or more may be employed.

The touch panel 190 may be arranged on the side surface of the case 110 as illustrated in FIG. 7.

Alternatively, a circular ring-shaped touch panel may be prepared and then the touch panel may be provided to surround the side surface of the case 110. Namely, the rotary ring 141 of the first embodiment may be replaced with the circular ring-shaped touch panel.

Alternatively, a touch panel may be employed instead of the rotary ring 145 as illustrated in the variant 1 (see FIG. 6), and also a circular ring-shaped touch panel may be provided to surround the display unit 130.

Alternatively, a touch panel may be incorporated in the display unit 130.

As compared with the rotary ring 141, the touch panel 190 has fewer mechanical elements and thus has an advantage that a waterproof property can be easily enhanced.

Meanwhile, the present invention is not limited to the foregoing embodiments, but can be appropriately modified within the scope without departing from the spirit of the invention.

Although in the foregoing embodiments and variants, the input means is described as having sensors which can identify a direction of operation, sensors which do not identify a direction of operation may be employed. For example, one sensor may be employed in the first embodiment.

In the case where the sensor does not identify a direction of operation, a certain switching button may be provided to allow a user to select count-up or count-down.

Although the dial gauge has been described by way of example, the rotational operation input portion or the touch panel may be provided on a vernier calipers or a micrometer.

What is claimed is:

1. A measuring instrument configured to detect a displacement of a contact point provided to be movable and to digitally display a measured value on a display unit provided on an outer surface of a case, comprising:
    an input unit that is provided on the outer surface of the case and that is configured to allow a user to input to the input unit through a manual operation, wherein
    the input unit includes a first photo sensor and a second photo sensor, which are configured to detect an amount of operation and a speed of operation,
    the amount of operation is converted into a conversion value in view of the speed of operation and then is displayed on the display unit,
    the input unit includes a rotary ring which is provided on the outer surface of the case and which is configured to be rotated by the manual operation,
    gear teeth are formed on an inner surface of the rotary ring,
    the first photo sensor and the second photo sensor are configured to emit light toward the gear teeth of the rotary ring and to receive reflected light, and
    the first photo sensor and the second photo sensor are positioned to be offset from each other by a predetermined length based on a wavelength of the emitted light, with respect to a pitch of the gear teeth of the rotary ring.

2. The measuring instrument according to claim 1, wherein the case has a short cylinder shape,
    wherein the rotary ring is a circular ring and is rotatably fitted to the case while surrounding a side surface of the case.

3. The measuring instrument according to claim 1, wherein the input unit is a touch panel provided on the outer surface of the case.

4. The measuring instrument according to claim 3, wherein the touch panel is assembled in a display surface of the display unit.

5. The measuring instrument according to claim 1, wherein the measuring instrument is any one of a dial gauge, a vernier caliper and a micrometer.

\* \* \* \* \*